Patented Jan. 2, 1945

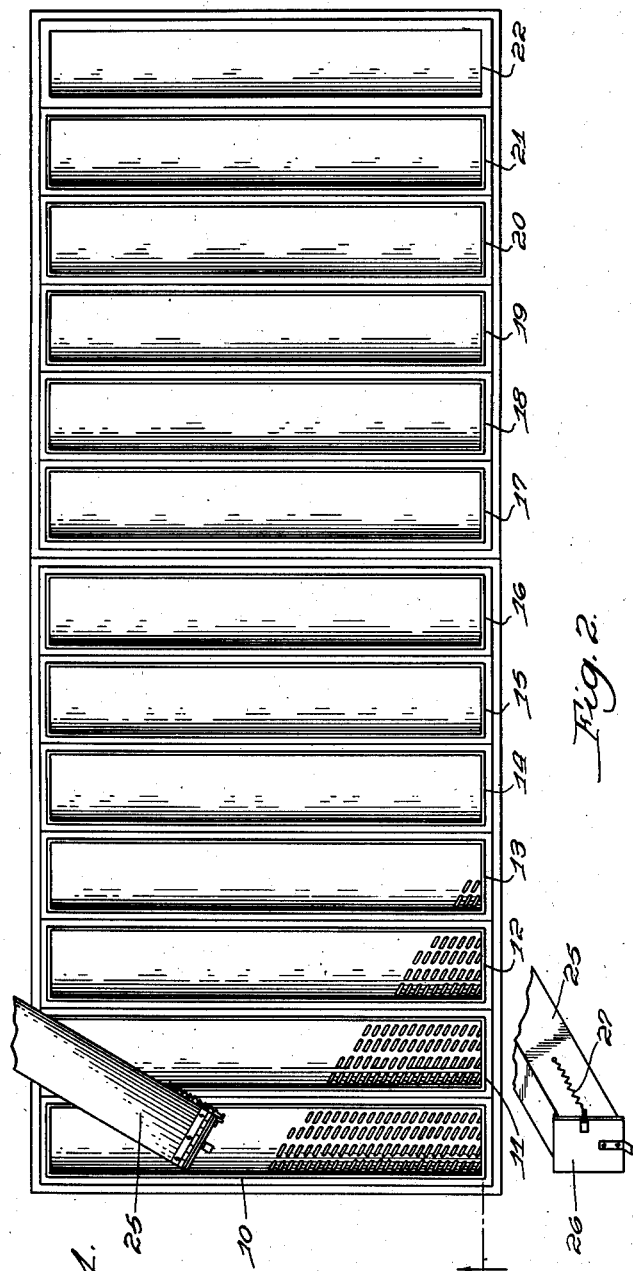
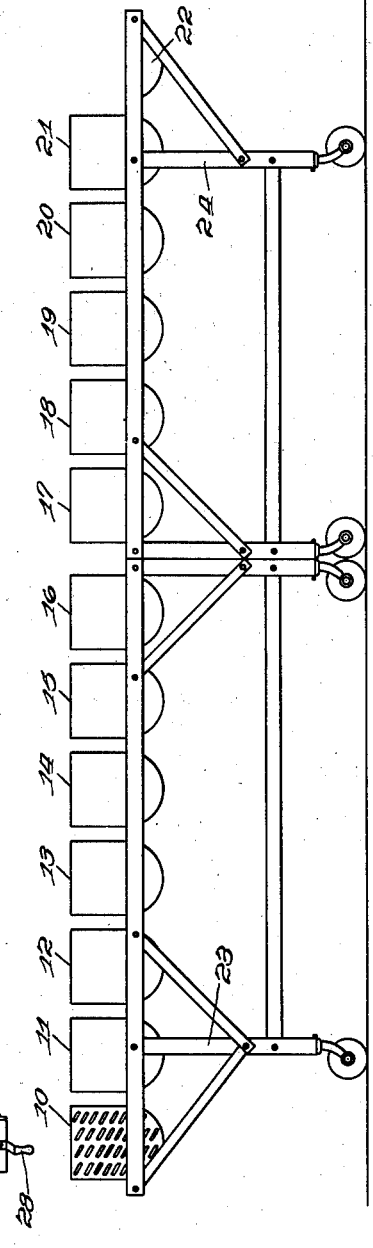

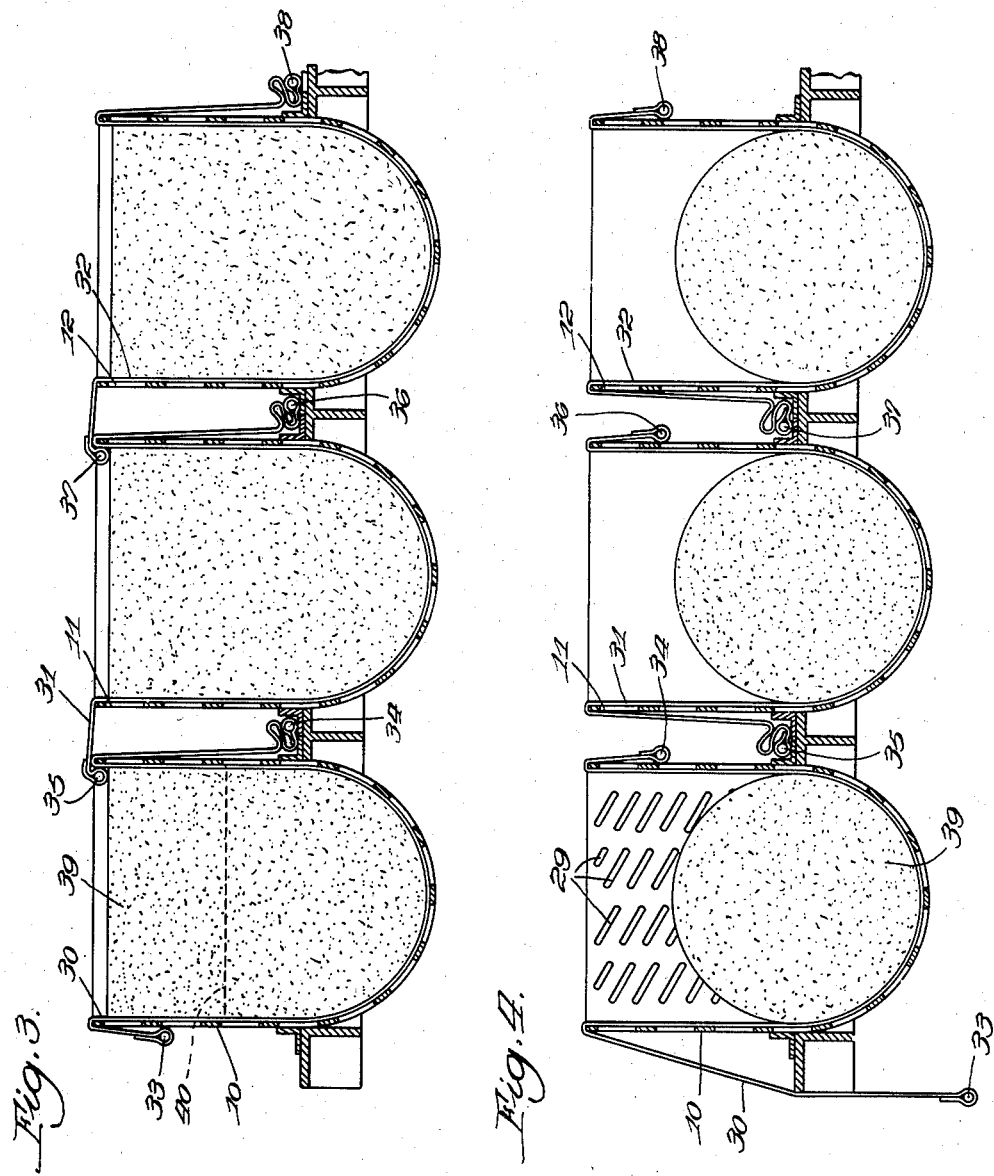

2,366,553

UNITED STATES PATENT OFFICE 2,366,553

CHEESE FORMING APPARATUS AND METHOD

Thorkild Petersen, Elgin, Ill., assignor to Pure Milk Cheese Co., a corporation of Illinois Application September 15, 1941, Serial No. 410,923

9 Claims. (Cl. 31—46)

This invention relates to cheese forming apparatus, and more particularly to an improved means and method for forming a mass of cheese curd into a cylinder adapted to be cut into cheese wheels.

One feature of this invention is that it facilitates the making of natural, cured cheeses in relatively small size wheels; another feature of this invention is that it provides for the setting and forming of a cylinder of cheese with the minimum of handling or other operations; yet another feature of this invention is that it enables a mass of curd to be delivered directly from the cheese vat to cylinder forming apparatus, eliminating completely an intermediate operation heretofore thought necessary; still another feature of this invention is that the forming apparatus is particularly adapted to handle cheese batches of various sizes; other features and advantages of this invention will be apparent from the following specification and the drawings, in which:

Figure 1 is a top plan view of apparatus embodying my invention; Figure 2 is a side elevational view of the apparatus shown in Figure 1; Figure 3 is a detail sectional view of several of the forming troughs, along the line 3 of Figure 1, with the cheese mass as it is first introduced therein; and Figure 4 is a view similar to Figure 3, but showing the cheese cylinders in condition to be removed from the trough.

Small families and small apartments, with little or no storage space, make relatively small cheese wheels much more marketable than large wheels, and small cheese wheels can be best formed by first forming a cylinder of cheese and then cutting it into wheels of appropriate size.

I have for some time been directing the manufacture of cheese wheels weighing a little over five pounds each in this manner, and have recently started the production of cheese wheels having a weight of approximately two pounds.

I have done a great deal of work in improving the method and apparatus of forming natural cheese wheels of small size adapted to provide properly cured and aged cheese, an apparatus and method for forming such cylinders and cutting them into wheels being disclosed in my Patent No. 2,165,005, which issued July 4, 1939. My present invention is an improvement over the process and apparatus there shown, in that it completely eliminates the necessity for the molding vat, and enables cheese cylinders of desired size to be formed with much fewer steps in the process.

My invention provides a plurality of horizontal troughs having semi-circular bottoms and vertical sides extending upwardly therefrom for a substantial height, the troughs being perforated to provide for proper drainage; contemplates the delivery of partially drained cheese curds directly to these troughs from the cheese vat; and forms the cylinders of properly knit cheese directly in the troughs by shifting the curd mass therein, and more particularly by using underlying cheesecloths to rotate the mass upon its longitudinal axis without removing it from the particular trough in which it is supported.

In the particular commercial process for which I developed the herein disclosed method and apparatus, fresh milk is first properly pasteurized, then cooled to a temperature slightly in excess of 90° F. and delivered to a cheese vat of substantial size, holding about ten thousand pounds of milk in a batch, although sometimes smaller batches are run. In the cheese vat cheese culture and a coagulating agent, as rennet, are added to the milk and, after it has been stirred or agitated, it is permitted to remain still for a considerable period to cause the casein and other solids in the milk to coagulate. The resultant mass is agitated at intervals, with a setting period between agitations, so that small pieces of cheese curd are formed. The whey incident to the curd formation is principally drained off near the end of the process in the cheese vat, sufficient being left to keep the cheese curds moist and to enable them to be readily flowed to the next piece of apparatus, which in this particular case is the cylinder-forming table.

In the particular embodiment of my invention disclosed herewith thirteen similar troughs, identified by the reference numerals 10 to 22, inclusive, are supported by table-like framework divided into two sections 23 and 24 for convenience of handling, each section comprising longitudinal and transverse angle irons supporting the troughs, appropriate legs for bracing, and casters to facilitate movement of the sections. The mass of cheese curd, with its accompanying whey, is delivered from the cheese vat (located a floor above the cylinder-forming and cheese-pressing room in the particular commercial process which I am describing) by a chute 25, this chute being pivotally mounted in the ceiling at its receiving end and having its discharge end controlled by a gate 26 normally held closed by the spring 27, but adapted to be opened as desired by the handle 28. When the curd mass has reached the proper condition upstairs it is delivered to the chute, and its discharge therefrom into the forming troughs is readily controlled by location of the chute and operation of the gate. That is, the mass of cheese curds and such whey as accompanies it are first delivered to one trough until it is substantially filled, a uniform distribution of the mass in the trough being attained by the use of wooden paddles or the like; then the flow from the chute is shut off by the gate, the chute discharge end swung over the next trough, and it filled, this being repeated until all but one of the troughs shown (the cutting trough 22) are filled. This last trough is used for cutting the formed cheese cylinders into wheels, as fully disclosed in my above-mentioned patent, and it and its use will not be further described here.

Since all of the forming troughs are identical, three of them are here shown in more detail in Figures 3 and 4, and the remainder of my description will be directed to the troughs shown in these figures. It will be noted that each trough has a semi-circular bottom and walls extending vertically upwardly therefrom for a substantial height. In a commercial embodiment of my forming apparatus each forming trough is 55¼ inches long, the bottom being formed with a radius of 4½ inches from a horizontal axis, and the vertical side walls extending up seven inches from the juncture with the bottom, so that the depth of the trough from the top to the center of the bottom is 11½ inches. In order to provide space for supporting frame members between them, the troughs are spaced about 1¾ inches. It will be understood, however, that these figures are given as merely illustrative, since they would depend upon the size of cheese wheel which it is desired to form, and upon the supporting framework used.

The bottom of each forming trough and its upwardly extending side and end walls are provided with drainage openings here identified as 29. These are necessarily somewhat exaggerated in the drawings in order that they may be properly shown, the drainage openings in actual practice being slots about one-half inch long and one-sixteenth inch wide. In conjunction with each forming trough I use a sheet of pliant porous material, as cheesecloth, the cloths in the troughs 10, 11 and 12 being here indicated as 30, 31 and 32. These cloths have the same length as the troughs, and a width somewhat greater, as ten or twelve inches, than what may be termed the inner perimeter of the troughs; that is, in connection with the troughs specifically described above I use cloths having a width of about forty inches.

Along the two long edges of the cloth it is doubled back to provide a hem, and these hems are provided with metal rods extending out a few inches beyond the end of the cloths on each end, to facilitate handling of the cheese mass in each trough. In the three cloths here particularly illustrated these rods are identified as 33, 34, 35, 36, 37 and 38. During the process of formation of the cheese cylinder the cloths underlie the cheese mass and enable it to be readily shifted or rotated about its longitudinal axis within the trough in which it lies.

Before the mass of cheese curd is delivered to the troughs, the cloths are laid therein as shown in Figure 3. It will be noted that the cloth associated with the trough 11 extends across the space between the troughs 10 and 11, with the rod 35 lying along the top edge of the right side (speaking with respect to Figure 3) of the trough 10, all of the remaining slack in each cloth lying between each trough and its adjacent trough. This arrangement prevents pieces of cheese curd from accidentally dropping into the space between the troughs and being wasted. As the troughs are first filled the mass of cheese curds and its associated whey fills the troughs as illustrated in Figure 3, the mass in the trough 10 being here indicated as 39.

As the whey drains off through the porous cheesecloth and the drainage openings 29, and as the cheese curds knit together and compact, the mass shrinks until its upper surface drops approximately to the level of the dotted line indicated as 40 in the trough 10. This takes about thirty or forty minutes, and the cheese mass should not be disturbed during this time if the curds are to properly knit together. At the end of this knitting period the rod 35 would be moved over out of the way onto the trough 11, the rods 33 and 34 grasped, and the rod 33 lifted up to rotate the cheese mass a complete half turn. While this can be accomplished by slipping the cheesecloth along the surface of the trough beneath it, the mass readily rolling over, it is preferably accomplished, at least on the first turn, by lifting the mass to some extent from the bottom of the trough, since this facilitates fitting and conforming the wider and rectangular upper edges of the curd mass into the curved bottom of the trough. It will be obvious that when it has been rolled over a half turn the upper surface (previously in contact with the semi-circular bottom) will be semi-circular and the weight of the mass will cause the still moldable remainder of the curd to form into a semi-circle, taking the exact shape of the bottom of the trough, the appearance of the mass about ten minutes after it has been thus turned being as illustrated in Figure 4. In order to assure proper forming and knitting of the entire cylinder it should preferably be shifted once or twice more at intervals of about ten minutes. After the mass has first been given a half revolution to turn it over, it is preferably given about one-quarter revolution on the next shift, and then a half revolution on a succeeding shift. It will be understood, of course, that the mass in each of the troughs is similarly handled, the men handling the operation first turning the mass in the trough 10, then that in the trough 11, etc.

After the cheese mass has been in the troughs about an hour, and been formed into a well-knit cylinder, each mass is lifted out of its trough by use of the cloths, carried down to the end or cutting trough 22, and there cut into wheels of appropriate size by cutter wires mounted in the the cutter frame. These wheels are then removed, placed in individual cheesecloths in hoops, and placed in a cheese press to compact them to the desired density, an improved press for this purpose being disclosed in my copending application Serial No. 410,924, filed September 15, 1941, which has been issued as Patent No. 2,347,793, May 2, 1944. After a proper pressing period the cheeses are soaked in a brine solution for several hours to arrest further acid development, then cured in cellars under appropriate conditions, for about a month in the particular commercial process which I have been describing.

While I have shown and described certain embodiments of my invention, it is to be understood that it is capable of many modifications.

Changes, therefore, in the construction and arrangement may be made without departing from the spirit and scope of the invention as disclosed in the appended claims.

I claim:

1. Apparatus of the character described for forming a mass of cheese curd into a cylinder, including: a horizontal trough having a semi-circular bottom and substantially vertical walls extending upwardly therefrom and having a height at least equal to the radius of said bottom, at least the bottom having drainage openings therethrough; and means for shifting the mass in the trough.

2. Apparatus of the character claimed in claim 1, wherein the trough is open at the top and the shifting means comprises a sheet of pliant, porous material partially underlying said mass.

3. Apparatus of the character described for forming a mass of cheese curd into a cylinder, including: a horizontal trough having a semi-circular bottom and substantially vertical walls extending upwardly therefrom and having a height approximately one and a half times the radius of said bottom, at least the bottom having drainage openings therethrough; and means for shifting the mass in the trough, this means comprising a sheet of pliant, porous material partially underlying said mass and provided with rigid handling members along two edges.

4. The method of making cheeses, comprising coagulating milk in a cheese vat to form cheese curds, partially draining the whey therefrom, delivering the curds directly from the cheese vat to an open trough of substantial depth having a semi-circular bottom and drainage openings, such delivery being before the cheese curds have knitted, leaving the curds undisturbed in the trough for a period, then shifting the mass about its longitudinal axis.

5. The method of making cheeses, comprising coagulating a large batch of milk in a cheese vat to form cheese curds, partially draining the whey therefrom, delivering the curds directly from the cheese vat to a plurality of similar open troughs of substantial depth having semi-circular bottoms and drainage openings and distributing the curds uniformly between the troughs to initially substantially fill them, such delivery being before the cheese curds have knitted, leaving the curds undisturbed in the troughs for a period sufficient for knitting, then inverting the partially formed mass in each trough.

6. The method of making cheeses, comprising coagulating a large batch of milk in a cheese vat to form cheese curds, partially draining the whey therefrom, delivering the curds directly from the cheese vat to a plurality of similar open troughs of substantial depth having semi-circular bottoms and drainage openings and distributing the curds uniformly between the troughs to initially substantially fill them, such delivery being before the cheese curds have knitted, leaving the curds undisturbed in the troughs for a period of approximately a half hour, whereby said curds knit together, then inverting the partially formed mass in each trough without inverting the trough.

7. The method of making cheeses, comprising coagulating a large batch of milk to form cheese curds, partially draining the whey therefrom, delivering the curds directly from the cheese vat to a plurality of similar open troughs of substantial depth having semi-circular bottoms and drainage openings and distributing the curds uniformly between the troughs to initially substantially fill them, such delivery being before the cheese curds have knitted, leaving the curds undisturbed in the troughs for a period sufficient for knitting, inverting the partially formed mass in each trough about its longitudinal axis without inverting the trough, then again shifting the curd about said axis after a period.

8. A method of the character claimed in claim 5, including cutting the cylindrical mass thus formed into wheels.

9. Apparatus of the character described for forming a mass of loose cheese curd, only partially drained, into well knit cylinders adapted to be cut into cheese wheels, comprising a plurality of troughs supported horizontally immediately adjacent each other and adapted to have said mass distributed therebetween, each trough having a semi-circular bottom and substantially vertical walls extending upwardly therefrom and having a height at least equal to the radius of said bottom, at least the bottom having drainage openings therethrough, each trough having associated therewith a sheet of pliant, porous material adapted to partially underlie the mass of cheese curd therein, the sheet being provided with rigid handling members along two edges, whereby the mass may be readily shifted in the trough to form it into the desired cylindrical shape.

THORKILD PETERSEN.